D. WILHELMI.
PICTURE-FRAMES FOR FLORISTS.
No. 179,751. Patented July 11, 1876.
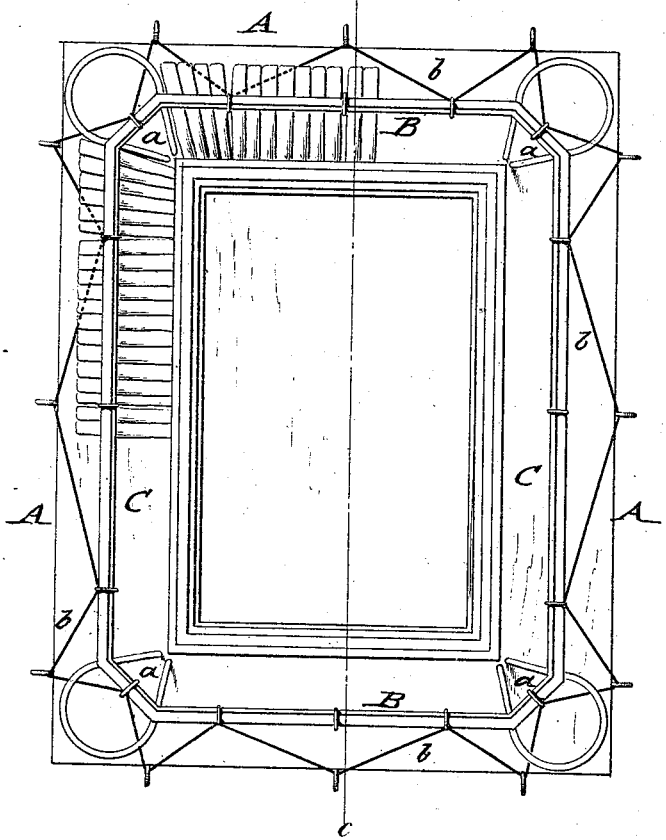
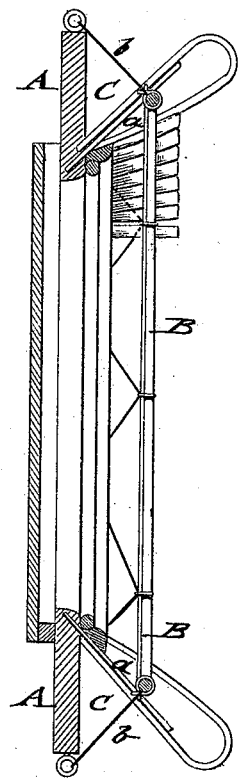
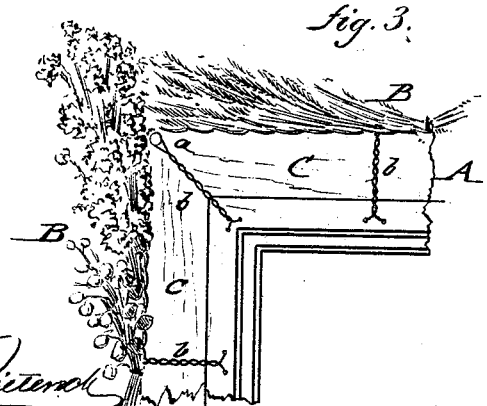

UNITED STATES PATENT OFFICE.

DIEDRICH WILHELMI, OF NEW YORK, N. Y.

IMPROVEMENT IN PICTURE-FRAMES FOR FLORISTS.

Specification forming part of Letters Patent No. 179,751, dated July 11, 1876; application filed June 12, 1876.

*To all whom it may concern:*

Be it known that I, DIEDRICH WILHELMI, of the city, county, and State of New York, have invented a new and Improved Picture-Frame for Florists, of which the following is a specification:

In the accompanying drawing, Figure 1 represents a front view of my improved picture-frame for florists; Fig. 2, a vertical transverse section of the same on line $c\ c$, Fig. 1; and Fig. 3, a modified form of the same.

Similar letters of reference indicate corresponding parts.

The object of my invention is to furnish for the use of florists and others an improved picture-frame, in which dried or living flowers may be arranged, so as to form with the holding-frame a neat and pleasing effect.

The invention consists of the outer base part of a picture-frame, with a raised wire or other frame, that forms a space around the frame for arranging and holding flowers therein.

In the drawing, A represents the surrounding picture-frame, that is made of plain wood or other material, and intended to form the support or base for the flowers arranged thereon. The frame A may be made of any shape or size, according to the purpose for which the frame is desired. Projecting from the base-frame A, and rigidly connected therewith by suitable posts $a$ and wires $b$, is a retaining-frame, B, made of straw, willow, wire, or any other suitable material, as fancy and taste may direct, which retaining-frame is adapted to the purposes for which the frame is required, whether for funerals, weddings, or other occasions. The raised or inclined retaining-frame B forms, with the base-frame, a hollow space, C, as shown in the drawing, into which living or dried flowers may be arranged, which form a floral frame around the picture. The flowers cover entirely the base-frame, and bring out the ornamental features of the retaining-frame.

In this manner entirely novel and unique effects may be produced, and a large variety of floral picture-frames furnished.

Having thus described my invention, I claim as new and desire to secure by Letters Patent—

A picture-frame for florists, made of a picture-surrounding base-frame, in connection with a raised retaining-frame for holding the flowers arranged thereon, substantially in the manner and for the purpose set forth.

DIEDRICH WILHELMI.

Witnesses:
PAUL GOEPEL,
T. B. MOSHER.